Dec. 14, 1965  C. E. ANDERSON  3,223,111
INTEGRAL VALVE AND SEAT UNIT
Filed Sept. 27, 1963  4 Sheets-Sheet 1
FIG. 1.
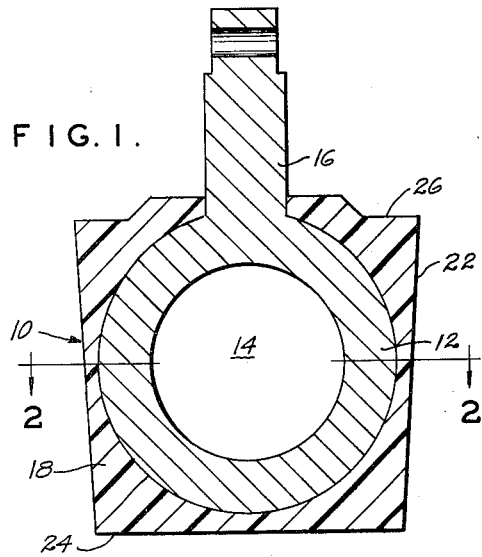
FIG. 2.
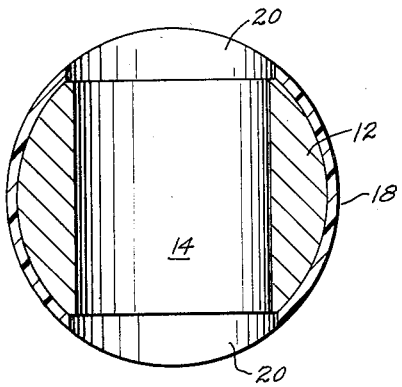
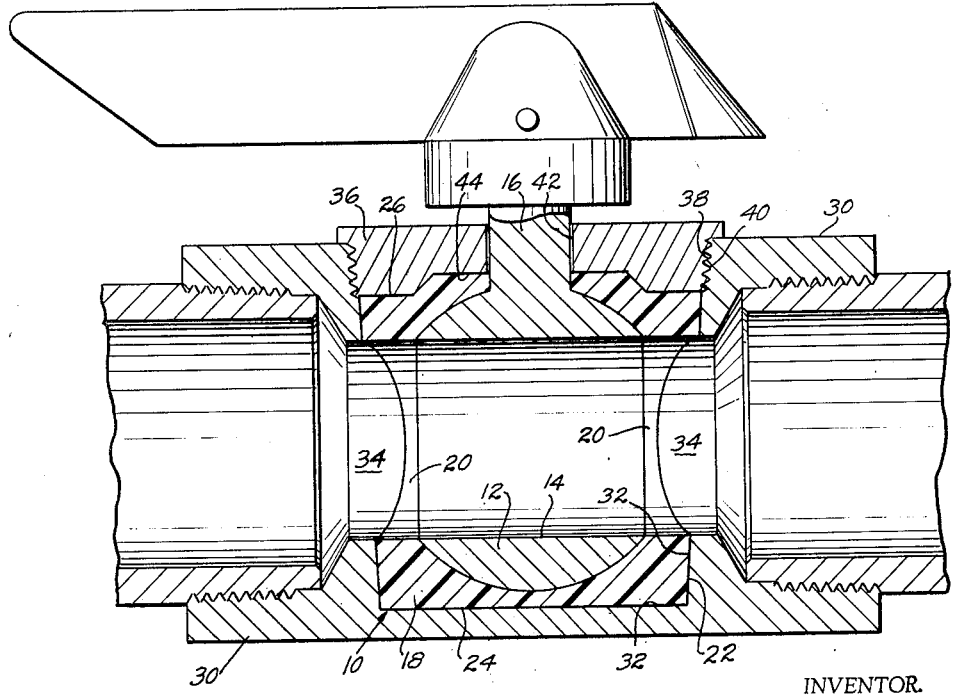
FIG. 3.
INVENTOR.
CLIFFORD E. ANDERSON
AGENT

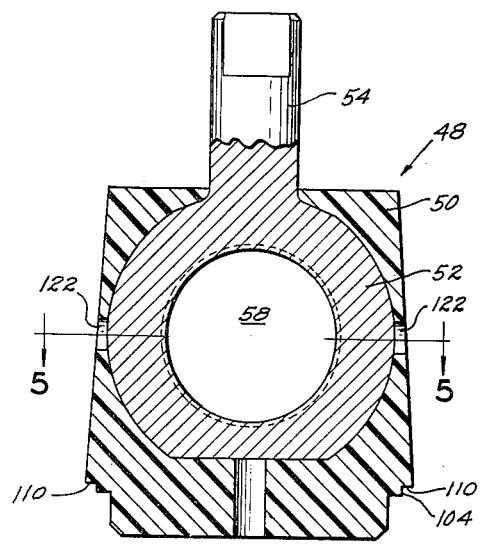
FIG. 4.
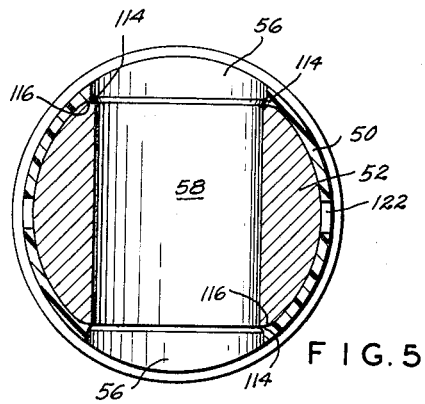
FIG. 5.
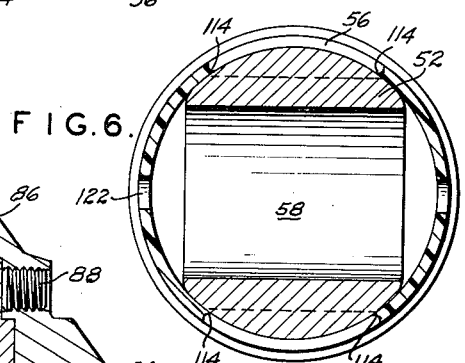
FIG. 6.
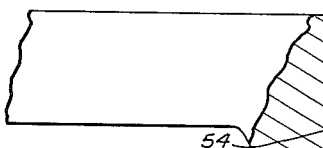
FIG. 7.
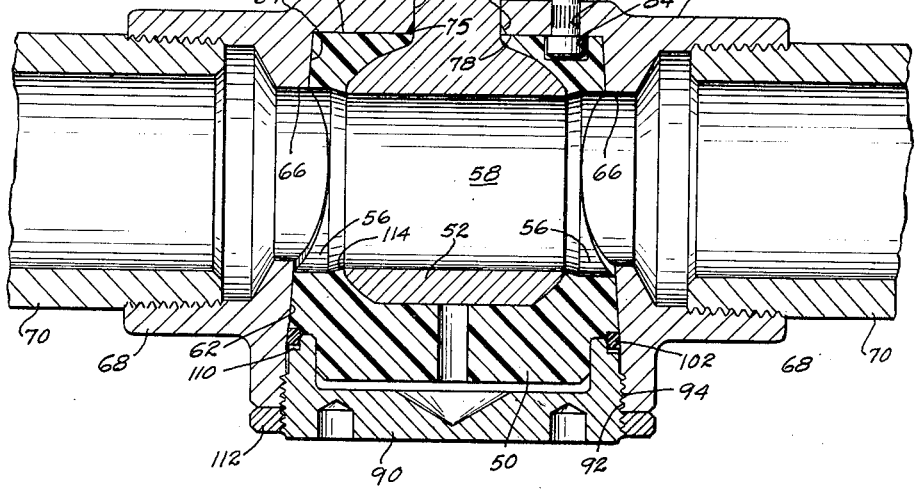

Dec. 14, 1965   C. E. ANDERSON   3,223,111
INTEGRAL VALVE AND SEAT UNIT
Filed Sept. 27, 1963
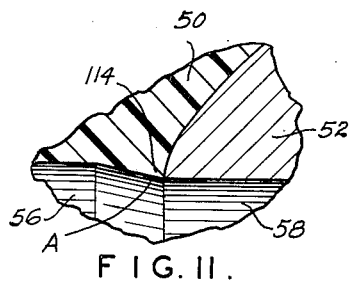
FIG. 11.
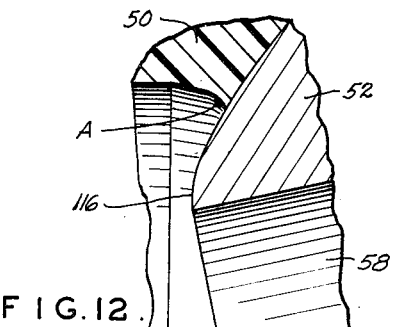
FIG. 12.
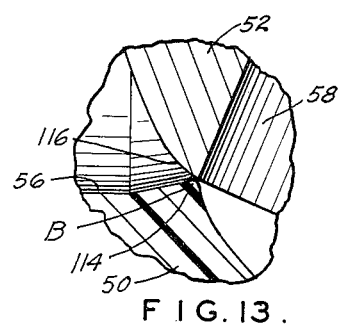
FIG. 13.
FIG. 14.
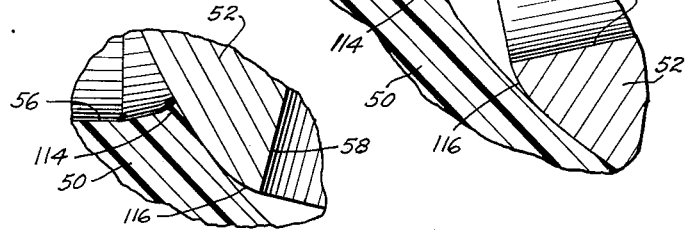
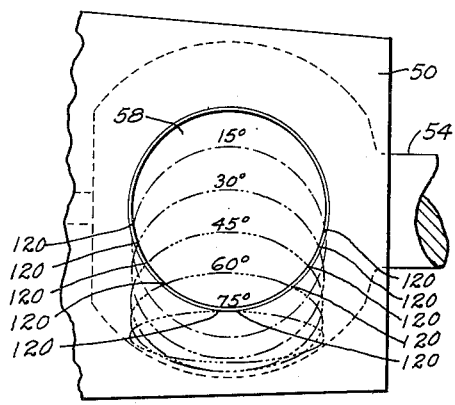
FIG. 15.
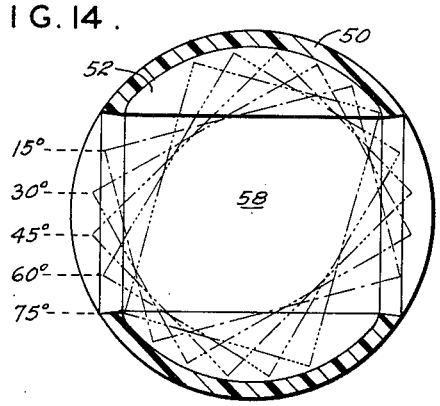
FIG. 16.

United States Patent Office 3,223,111
Patented Dec. 14, 1965

3,223,111
INTEGRAL VALVE AND SEAT UNIT
Clifford E. Anderson, Houston, Tex., assignor to ACF Industries, Incorporated, New York, N.Y., a corporation of New Jersey
Filed Sept. 27, 1963, Ser. No. 312,233
7 Claims. (Cl. 137—454.6)

This invention relates to rotatable plug valves and particularly to a valve and seat unit in which a seat member of moldable plastic material is integrally molded about a valve member.

This application is a continuation-in-part of my application Serial Number 82,202, filed Jan. 12, 1961, and now abandoned, and titled "Integral Value and Seat Unit."

Plug valves are quite old in the art. Basically, they consist of a valve body having a centrally located valve chamber with an inlet and outlet passage in communication therewith. A valve member is positioned in a valve chamber and has a passage which in the open position is aligned with the inlet and outlet passages. Usually with a quarter turn the valve will be in the closed position and the valve member in cooperation with the valve seat will block flow. This quarter turn operation has always been recognized as an outstanding feature. However, as with any valve, the ability to seal and ease of operation are the two main requirements of a plug valve. Originally, the seal for the plug valve was established by having a tapered valve member which effected a seal with the lubricated wall of the valve chamber. Later the valve member took other forms such as cylindrical or spherical and means of sealing other than the metal-to-metal contact of valve member and wall of the valve chamber was used. One such method of sealing was the utilization of a seat member formed of plastic material which has the ability to easily flow into minute crevices in order to effect a seal without the use of a lubricant. Rubber was one of the first materials so used. While rubber had some disadvantages, the development of the fluorocarbon resins such as polytetrafluoroethylene, which is commercially available in the United States under the trademark Teflon, made available a stable plastic material inert to most commonly used fluids and having a very low coefficient of friction. The utilization of this material as a valve seat rapidly developed, and in plug valves there was a resurgence of the spherical plug valve commonly referred to as a ball valve. While in some of the ball valves the seats are inserted through and end, a top entry construction is considered more desirable since it permits repair while the valve is in the line. However, because of its construction, the top entry ball valve is more expensive to manufacture. While attempting to develop a more economical top entry ball valve, a discovery was made which, while it is particularly advantageous for ball valves, is also of value for other types of plug valves. It is to this discovery that the present application is primarily directed.

In its broad aspect, this invention is directed to a valve and seat unit in which a seat member of moldable plastic material is integrally molded about a valve member. The utilization of this valve and seat unit forms a rotatable plug valve which is economical to manufacture, easy to assemble, requires little maintenance and provides a valve which is easy to operate and will effectively seal in either direction. A plug valve utilizing this unit consists of a valve body having a valve chamber in which the unit is positioned and force supplying means which applies a load to the unit to establish a seal between the valve member and seat and seat and valve chamber at the same time the unit provides a seal for the valve chamber and stem passage. Passages in the seat member and valve member which are aligned in the open position form a portion of the run of the valve.

It is the principal object of the present invention to provide an integral valve and seat unit comprised of a seat member of moldable plastic material integrally molded about a valve member.

It is another object to provide a single valve and seat unit which functions as a load carrying valve member retainer, a lading sealing across the line, and a seal for the stem and bonnet.

It is a further object to provide a rotatable plug valve comprised of a valve body having a valve chamber and a valve and seat unit positioned in such chamber which effectively seals flow from either direction.

It is among the objects of this invention to provide a rotatable plug valve comprised of a valve body having a valve chamber and a valve and seat unit wherein a portion of the valve body is adjustable to apply pressure on specific areas of the unit to provide for sealing compression adjustment in the event of excessive tolerances due to wear between the valve and the seat.

A still further object of this invention contemplates the provision of a rotatable plug valve having a removable valve and seat unit therein wherein the seat is formed with integral yieldable lips for engagement with the valve at all positions thereof.

It is a further object of this invention to provide a rotatable plug valve having a unitary valve and seat having pressure relief openings at a position to relieve any undesirable pressure between the seat and the inner surface of the valve.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specifications, wherein:

FIGURE 1 is a vertical section of the valve and seat unit of the present invention.

FIGURE 2 is a horizontal section of the unit shown in FIGURE 1 taken generally along lines 2—2.

FIGURE 3 is a vertical cross section of a rotatable plug value incorporating the valve and seat unit of the present invention.

FIGURE 4 is a vertical section illustrating a modified form of the valve and seat unit of the present invention.

FIGURE 5 is a horizontal section of the unit shown in FIGURE 4 taken generally along lines 5—5, showing the valve in open position.

FIGURE 6 is a horizontal section of the unit shown in FIGURE 4 taken generally along lines 5—5 and showing the valve in the closed position.

FIGURE 7 is a vertical cross section of a modified form of rotatable plug valve and incorporating the valve and seat unit illustrated in FIGURES 4–6.

FIGURE 11 is an enlarged vertical section showing the position of the sealing lips of the valve seat in the open position of the valve.

FIGURE 12 is an enlarged vertical section illustrating the position of the lips of the valve seat during rotation of the valve from open to closed position.

FIGURE 13 is an enlarged vertical section illustrating the position of the sealing lip of the valve seat at the substantially closed position of the valve.

FIGURE 14 is an enlarged vertical section illustrating compression of a portion of the lip of the valve seat by the valve member.

FIGURES 15 and 16 are schematics illustrating various positions of the valve bore with respect to the seat member.

Figure 8:
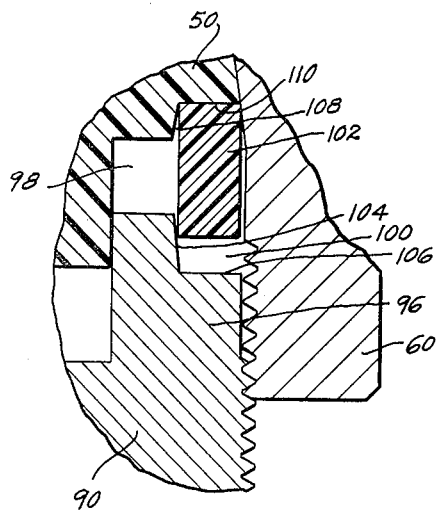
FIGURES 8–10 are enlarged vertical sections illustrating the sealing ring structure in detail.
Figure 9:
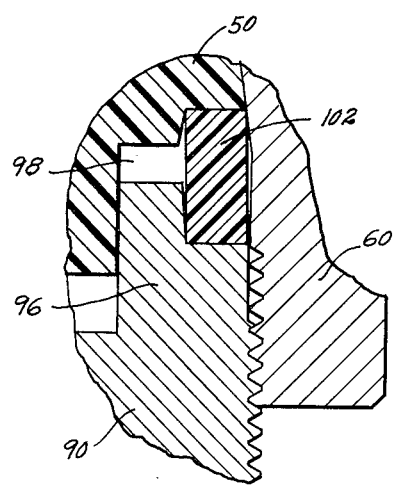
Figure 10:
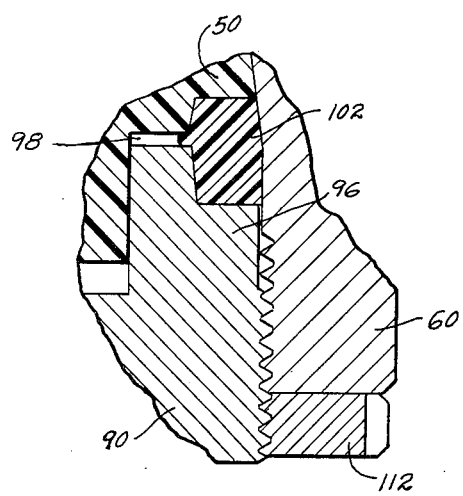

Referring now to the drawings for a better understanding of this invention, FIGURES 1 and 2 show an integral valve and seat unit 10 of the present invention. The valve and seat unit 10 is comprised of a valve member 12 having a through passage 14. The valve member 12 is provided with an integral stem portion 16 extending from one end thereof and being normal to the axis of the passage 14. If desired, the stem 14 may be separate. About the valve member 12 there is integrally molded a plastic seat member 18, which is provided with axially aligned passages 20—20. The passages 20—20 are shown axially aligned to provide inline flow, however, if desired, the passages 20—20 may be angularly disposed. In any event, the passage 14 and passages 20—20 may be aligned to form a portion of the run of the valve.

The valve member 12 illustrated is generally spherical, however, the valve member 12 may be in any other surface of rotation about the stem. A spherical shape gives certain advantages such as that there is always a maximum equal distance which fluid will have to travel in order for it to become a leak. Also, by its geometry, a spherical shape results in a unit having the smallest volume for a given valve opening. Moreover, with a spherical shape it would be posisble to have ports at any place about the spherical surface.

The material forming the seat member 18 may be any material which has a property enabling it to be molded around a valve member to form a non-rigid seat member. Naturally, as is well known in the molding art, mold release or anti-sticking compound is placed on the surface of the valve member 12 before the material forming the seat member 18 is molded about it to prevent the material sticking or adhering thereto. One of the materials found particularly useful for the seat member is the previously described Teflon. However, the other fluorocarbon plastics, such as polychlorotrifluoroethylene sold under the trademark Kel-F, and others may be used. Some of the other materials which can be used are polyvinyl chloride, and those materials known commercially by their trade names as nylon, Viton, Hyperlon, Hycar, and other types of synthetic rubber. Hereinafter, when the term moldable plastic is used, it will be understood to include materials of the types listed above. As is well known in the art, the use of a particular material will depend upon the lading carried in the valve and the pressure and temperature at which the valve will be used.

The outer configuration of the seat member 18 illustrated is shown as frusto-conical having an angular side wall 22, bottom wall 24, and top wall 26, through which the stem 16 extends. The frusto-conical shape is desirable for harder plastics such as Teflon or nylon, which have a high Poisson's ratio of longitudinal to radial deformation when subjected to longitudinal loading. For softer materials such as rubber, Hycar, Viton, etc., having relatively low Poisson's ratio, a cylindrical outer configuration may be used since with such materials vertical force results readily in radial compression.

FIGURE 3 illustrates the incorporation of the integral valve and seat unit 10 in a rotatable plug valve. The valve is comprised of a valve body 30, having a centrally located open ended valve chamber 32, having a generally tapered cylindrical inner wall and axially aligned inlet and outlet passages 34—34, which communicate with the valve chamber 32. When the integral valve and seat unit 10 is positioned in the valve chamber 32, the passages 20—20 of the seat member 18 are aligned with the inlet and outlet passages 34—34. The stem 16 projects past the top of the open ended valve chamber 32.

In order to close the open end of the valve chamber 32 and exert force on the unit 10 to cause it to form the necessary seals, there is provided a bonnet 36. The bonnet 36 is provided with a threaded portion 38, which engages with an internally threaded portion 40, located around the top of the valve chamber 32. The bonnet is also provided with a passage 42, through which the stem 16 extends. As the bonnet is turned into position, the bottom surface 44 of the bonnet 36 contacts the top surface 26 of the valve and seat unit 10 and exerts a uniform pressure upon it. Since the valve member 12 is formed of plastic material, it tends to flow when under pressure, thus transmitting force to all surfaces of the valve. The bonnet 36 applies a sufficient force to the unit 10 to establish a seal between the spherical surface of the valve member 12 and the inner surface of the seat member 18, and between the annular wall 22 of the seat member 18 and the wall of the valve chamber 32. Simultaneously a seal is established around the opening between the bonnet 36 and the wall of the valve chamber 32. A further seal is established about the passage 42 through which the stem 16 extends. To provide for adjustment of the bonnet 36 to compensate for wear between the valve and seat, a shim may be placed between the bonnet and the surface 26 of the seat member 18.

After the valve has been assembled, the seat member 18 remains stationary in its oriented position and the valve member 12 can be rotated between the open and closed positions. In the closed position, the generous contact area between the valve and the seat member 18 supports the valve against the thrust of the upstream line pressure, thereby maintaining the valve member 12 in its correct position.

Referring now to FIGURES 4–6, a modified embodiment of the seat and valve unit generally at 48 is illustrated, which comprises an integral non-rigid generally frusto-conical seat member 50, which is formed about a valve member 52, having a stem 54, extending through the seat member 50. The seat member 50 is formed with axially aligned through passages 56—56, which are alignable with a through passage 58, formed in the valve member 52 to define the flow path through the seat and valve unit.

FIGURE 7 illustrates the incorporation of the integral valve and seat unit in a rotatable plug valve. The valve is comprised of a valve body 60, having a centrally located open ended chamber 62, formed by a frusto-conical inner wall 64 and axially aligned inlet and outlet passages 66—66, which communicate with the valve chamber 62. Internally threaded connecting portions 68—68, aligned with the inlet and outlet passages, are integrally formed on the valve body 60 for threadedly connecting the valve body 60 to a piping system 70–70. The valve body 60 is provided with a centrally located opening 72 through which the stem 54 of the valve 52 extends when the unit 48 is positioned within the chamber 62. The internal wall of the body 60 is chamfered about the opening 72 to define an annular chamber 74, which is triangular in cross section and in which an annular sealing element 75 is positioned to effect a seal between the opening 72 and the stem 54 and also between the top surface 76 of the seat and the upper wall 78 of the chamber 62. The sealing element 75 may either be an elastomer ring type seal or if the corrosive condition of the lading is such that an elastomer would deteriorate, a sealing element formed of Teflon, polytetrafluoroethylene, discussed hereinabove, or another corrosive resistant substance of a like character may be employed. The sealing element 75 might also be formed integrally with and of the same material as the seat member 48. If the sealing element 75 is a separate piece from the unit 48, it will have the tendency to pressure actuate in addition to the compression seal which will be effected whether it is integral or separate.

A pin member 80 is press-fitted within an opening 82 in the upper wall 78, and has a different portion thereof protruding from either end of the opening 82. A lower portion of the pin 80 is positionable within a recess 84 in the seat member 50 (FIGURE 7) and serves to correctly align the unit 48 within the chamber 62, upon insertion of the unit, and to prevent rotation of the unit within the chamber after installation of the unit is complete. The upper portion of the pin 80 serves as a 90° limiting stop and is engaged by a surface on an operating handle 86, which is retained on the stem 54 by a set screw 88, to limit turning of the valve member between fully open and fully closed positions.

As indicated hereinabove, the valve chamber 62 is generally frusto-conical in shape and is defined by tapered walls. In accordance with a feature of this invention, an adjustable bonnet member 90, having external threads 92 thereon, is adapted for theaded engagement with internal threads 94, formed on a cylindrical portion of the tapered wall of the valve chamber 62, to close the chamber and to apply sealing compression to the valve and seat 48. A flange 96 on the bonnet member 90 cooperates with an annular recess 98, formed in the seat member 50, to define an annular groove or space 100 (FIGURE 8). An annular sealing ring 102 of non-rigid material is positioned within the groove 100 for establishing sealing engagement between the seat member 50 and the internal wall of the body member 60. The sealing ring is illustrated as generally rectangular in cross section, but obviously it may have various other cross sectional shapes without departing from the scope of this invention. The material from which the sealing ring is composed may be rubber or a synthetic elastomer, or it might be composed of various non-rigid plastics.

A tapered annular surface 104 and an annular shoulder 106, formed on the flange 96 of the bonnet, cooperate with a tapered annular surface 108 and an annular shoulder formed on the seat member 50, to engage and apply pressure on the sealing ring 102 upon inward threading of the bonnet 90. Since the sealing member is non-rigid and readily flowable under pressure, it will readily be actuated by line pressure and conform to the shape of the annular groove defined by surfaces 104 and 108, the shoulders 106 and 110, and the tapered wall of the chamber, and will effect an extermely tight seal between the body, seat, and bonnet.

A locking member 112 is threadedly attached to the bonnet member 90 and is adjusted into tight engagement with the bonnet 60 to prevent undesired longitudinal movement of the bonnet, such as might occur under conditions of prolonged vibration.

In accordance with another feature of this invention as shown in FIGURES 7 and 11–14 inclusive, the seat member 50 is provided with an annular sealing lip 114, which is integral therewith and which, in the closed position of the valve, as described in detail hereinbelow, is cammed toward the flow passages thus, providing an increased compression and establishing a tighter seal about the valve member 52. As is illustrated in detail in FIGURES 11–14, the spherical contour of the valve is changed at the intersection of the spherical surface of the valve and the cylindrical surface of the bore 58 to a greater degree of curvature forming a cam surface 116. It will be understood that forming the seat member 50 to conform with the surface of the valve member 52 results in the formation of the lips 114 in the manner illustrated in FIGURES 11–14. It should be noted that the bore 58 of the valve member is smaller in diameter than the diameter of the through passages 56—56. The integral lip members 114 are formed by tapering the diameter of the through passages 56—56 to align with the diameter of the bore 58 of the valve. This arrangement places the lip portions 114 partially within the bore. It will also be understood that the material forming the lips 114 will be displaced by the spherical surface of the valve member upon turning thereof, thus producing a tighter seal during the rotational movement and at the closed position of the valve. While the valve is open and under line pressure, the flexible lips 114, because they extend partially into the flow passage, as discussed above, will be forced into tighter engagement with the cam surface 116 of the valve by line pressure, thus achieving a tighter seal at the valve open position and preventing a flow of pressurized fluid between the valve 52 and the seat 50.

FIGURE 12 shows the relationship of the lip members 114 as the valve member is rotated from a fully open position (FIGURE 11) toward its closed position. The cam surface 116, formed about the bore of the spherical valve member 52, forces a portion of the lip 114, shown at A in FIGURE 12, outwardly into the through passage, while on the opposite side of the unit the portion of the lip 114, shown at B, is completely relieved since the contacting portion of the valve member has moved out of contact with the lip 114. FIGURE 13 illustrates the condition of that portion of the lip member 114, shown at B, after the valve member has been rotated so that the cam surface 116 on the valve member 52 nearly engages the lip 114. FIGURE 14 illustrates the compressed condition of the lip member 114 after it has been cammed into sealing engagement with the spherical surface of the valve member 52, upon further rotation of the valve member toward its closed position from the position illustrated in FIGURE 13.

FIGURES 15 and 16 are operational views illustrating movement of the valve 52 within the seat 50 from an open position to a 75° partially closed position in 15° increments and are meant to be taken along with FIGURES 11–14 to illustrate the action of the lips 114 during the turning movement. It should be again noted at this time that FIGURE 11 illustrates the valve in its open position, while FIGURES 12 and 14 illustrate the valve 52 at various positions of rotation within the seat member 50.

As the valve member is rotated approximately 15°, as illustrated by a dotted line marked 15° in FIGURES 15 and 16, the lip member 114 begins to be folded or cammed at points 120 in a direction toward the flow passage by the cam surface 116 of the valve member 52. As folding or camming of the lip by opposite sides of cam surface 116 continues, the points of camming action 120 become closer and closer together until at a substantially closed position almost all of the sealing lip 114 is folded away from the bore. Due to the resilience of the material from which the seat and integral lip are formed, the lip portion B, which is last to contact the valve (FIGURE 13), will be partially folded toward the flow passage before contact between that portion of the valve and lip occurs. Therefore, it will be understood that no shearing of the lip will take place upon closing of the valve, and the cam portion 116 of the valve member 52 will also cam the portion B of the lip in a direction toward the flow passage 56. Except for the presence of the cam surface 116 of the valve, the upper portion of the valve would tend to shear the lower portion of the lip thus resulting in severe deterioration of the valve unit. It will be understood that the cam portions 116 of the valve 52, and the flexible lips 114 of the seal 50, cooperate to produce an extremely tight sealing effect under all conditions of the valve, while at the same time resulting in a turning torque which is low.

It is obvious, however, that wear on the sealing surfaces of the valve as well as other undesirable conditions might permit a build up of pressure between the interior wall 64 of the body and the exterior wall of the valve and seat unit 48. If this condition should occur under high line pressures, the material of the seat could become displaced into the bore 58 of the valve in a position to be sheared by the valve upon movement thereof. Accordingly, a pressure relief port 122 is formed in the seat member centrally of the cavity, retaining the valve member 52, and normal to the bore 56—56. During the closed position of the valve, any pressure build up between the wall of the body and the seat and valve unit will be vented into the bore 58 of the valve, thus preventing extrusion or displacement of the material of the seat into a position such that it might be sheared upon turning movement of the valve.

From the foregoing, it will be seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or as shown in the accompanying drawings is to be interpreted as illustrative and not in a limiting sense.

I claim:

1. An integral valve and seat unit for a rotatable plug valve having a valve chamber formed therein, said unit comprising: an integral seat member formed of moldable resilient plastic material having a generally spherical cavity formed therein and flow passages communicating with said cavity, a rotatable valve member having a generally spherical exterior surface positioned within said cavity for rotation therein, said valve member having a through passage alignable with said flow passages in the open position of said valve and means blocking said flow passages in the closed position of said valve, cam surfaces formed on said plug member at the intersection of said through passage with said spherical surface, a pair of lips disposed one about each of said flow passages, said lips being integral with said seat member, said lips having valve engaging surfaces of the same shape as the shape of said cam surfaces and sealingly engaging said valve at all positions thereof, said lip means engaging said valve member with greater sealing pressure at the closed position of the valve than at the open position.

2. A rotatable plug valve comprising; a body having an open ended valve chamber, inlet and outlet passages formed in said body and communicating with said valve chamber, an aperture formed in said body opposite the open end of the valve chamber, an integral valve and seat unit positioned in said valve chamber, said unit comprising a rotatable generally spherical valve member having stem means extending through said aperture, a through passage alignable with the aligned inlet and outlet passages in the open position of the valve and solid portions covering said inlet and outlet passages in the closed position of the valve, an integral seat member of moldable plastic material formed about said spherical valve member, said seat member having flow passages aligned with said inlet and outlet passages and an outer configuration generally conforming to the configuration of the valve chamber, a bonnet closing the open end of the valve chamber, said bonnet applying a force on a peripheral portion of the unit to establish a seal between the valve member and the seat member and between the seat member and the wall of the valve chamber, said seat member having diametrically opposed pressure relief passages formed transversely to said flow passages, whereby pressure, which may build up between said unit and said chamber wall, will be vented into said through passage.

3. A rotatable plug valve comprising, a body having an open ended valve chamber, inlet and outlet passages formed in said body and communicating with said valve chamber, an aperture formed in said body opposite the open end of the valve chamber, an integral valve and seat unit positioned in said valve chamber, said unit comprising a rotatable valve member having stem means extending through said aperture, a through passage alignable with the aligned inlet and outlet passages in the open position of the valve and solid portions covering said inlet and outlet passages in the closed position of the valve, an integral seat member of moldable plastic material formed about said valve member, said seat member having flow passages aligned with said inlet and outlet passages and an outer configuration generally conforming to the configuration of the valve chamber, a bonnet closing the open end of the valve chamber, said bonnet applying a force on a peripheral portion of the unit to establish a seal between the valve member and the seat member and between the seat member and the wall of the valve chamber, said seat member having a peripheral shoulder defining an annular recess, said bonnet having an annular flange and defining with said peripheral shoulder and said body an annular enclosed sealing ring chamber, an annular ring of non-rigid material disposed in the sealing ring chamber and adapted to be compressed by the annular flange upon inward movement of said bonnet to deform to the shape of said sealing ring chamber and to effect a seal between the seat member, the body and the bonnet.

4. A rotatable plug valve comprising, a body having an open ended valve chamber, inlet and outlet passages formed in said body and communicating with said valve chamber, an aperture formed in said body opposite the open end of the valve chamber, an integral valve and seat unit positioned in said valve chamber, said unit comprising a rotatable valve member having stem means extending through said aperture, a through passage alignable with the aligned inlet and outlet passages in the open position of the valve and solid portions covering said inlet and outlet passages in the closed position of the valve, an integral seat member of moldable plastic material formed about said valve member, said seat member having flow passages aligned with said inlet and outlet passages and an outer configuration generally conforming to the configuration of the valve chamber, a bonnet closing the open end of the valve chamber, said bonnet applying a force on a peripheral portion of the unit to establish a seal between the valve member and the seat member and between the seat member and the wall of the valve chamber, said valve chamber having a tapered interior wall, said seat member having a perpiheral shoulder defining an annular recess, said bonnet having an annular flange with a tapered exterior wall thereon and defining with said peripheral shoulder and said tapered interior wall of said chamber an annular enclosed sealing ring chamber, an annular ring of non-rigid material disposed within the sealing ring chamber and adapted to be compressed by the annular flange upon inward movement of said bonnet to deform to the shape of said sealing ring chamber and to effect a seal between the seat member, the body, and the bonnet.

5. A rotatable plug valve comprising, a body having an open ended valve chamber, inlet and outlet passages formed in said body and communicating with said valve chamber, an aperture formed in said body opposite the open end of the valve chamber, an integral valve and seat unit positioned in said valve chamber, said unit comprising a rotatable valve member having stem means extending through said aperture, a through passage alignable with the aligned inlet and outlet passages in the open position of the valve and solid portions covering said inlet and outlet passages in the closed position of the valve, an integral seat member of moldable plastic material formed about said valve member, said seat member having flow passages aligned with said inlet and outlet passages and an outer configuration generally conforming to the configuration of the valve chamber, a bonnet closing the open end of the valve chamber, said bonnet applying a force on a peripheral portion of the unit to establish a seal between the valve member and the seat member and between the seat member and the wall of the valve chamber, a pin extending through an opening in said body, said seat member having a recess formed therein and receiving a portion of said pin to align said flow passages with said inlet and outlet passages and to prevent rotation of said seat member within said chamber.

6. A rotatable plug valve comprising, a valve body having an open ended valve chamber, inlet and outlet passages formed in said body and being in communication with said valve chamber, an aperture formed in said body opposite the open end of said valve chamber, said unit comprising a plug member having a generally spherical outer surface and having integral stem means extending through said aperture, a through passage formed in said valve member and being alignable with said inlet and outlet passages in the closed position of the valve, said valve member having solid portions blocking said inlet and outlet passages in the closed position of the valve, an integral seat member of moldable resilient plastic material formed entirely about the spherical surface of said valve member and being in intimate sealing engagement with said spherical surface, said seat member being yieldingly deformable to conform to minor surface irregularities of said valve member, said seat member being formed with flow passages aligned with said inlet and outlet passages and alignable with said through passage in the open position of said valve, a bonnet threadedly received within the open end of said valve chamber and applying a force on a peripheral portion of said seat member to establish a seal between said seat member and said body, between said valve and said seat member and between said seat member and said stem, said seat member having integrally formed lip means thereon in sealing engagement with said valve member at all positions thereof, said lip means engaging said valve means with higher pressure in the closed position than in the open position of said valve.

7. A rotatable plug valve in accordance with claim 6, said integral lip means adapted to be actuated by line pressure to establish a tight sealing engagement in all positions of the valve.

References Cited by the Examiner

UNITED STATES PATENTS

| | | | |
|---|---|---|---|
| 860,217 | 7/1907 | Jackson | 137—454.6 |
| 2,117,456 | 5/1938 | Schellin | 251—317 |
| 2,182,930 | 12/1939 | Nordstrom | 251—288 |
| 2,387,013 | 10/1945 | Fuller | 251—368 X |
| 2,766,961 | 10/1956 | Meusy | 251—317 X |
| 2,776,104 | 1/1957 | Sinkler | 251—317 X |
| 2,840,102 | 6/1958 | Richter | 137—454.6 |
| 2,845,085 | 7/1958 | Robbins | 137—454.6 |
| 2,869,221 | 1/1959 | Siepmann | 29—157.1 |
| 2,895,710 | 7/1959 | Sanctuary | 251—315 X |
| 2,911,187 | 11/1959 | Owsley | 251—316 |
| 2,945,666 | 7/1960 | Freeman | 251—315 X |
| 2,989,990 | 6/1961 | Bass | 251—317 X |
| 3,041,036 | 6/1962 | McFarland | 251—171 |
| 3,047,007 | 7/1962 | Lunken | 251—315 X |
| 3,066,909 | 12/1962 | Reed | 251—317 X |
| 3,072,379 | 1/1963 | Hamer | 251—317 X |
| 3,100,501 | 8/1963 | Hansen | 251—317 X |

FOREIGN PATENTS

| | | |
|---|---|---|
| 690,367 | 4/1953 | Great Britain. |

ISADOR WEIL, *Primary Examiner.*